June 14, 1927.
H. O. HUTCHENS ET AL
1,632,652
TIRE TREAD APPLYING MACHINE
Filed Jan. 31, 1925     2 Sheets-Sheet 2
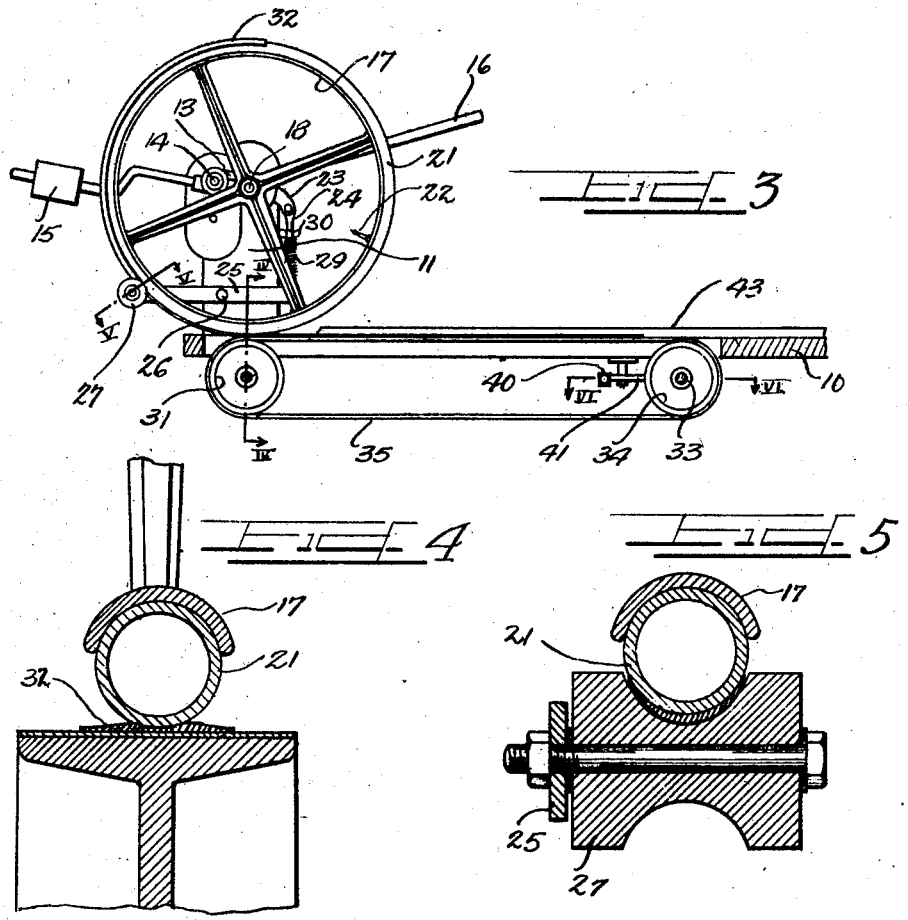
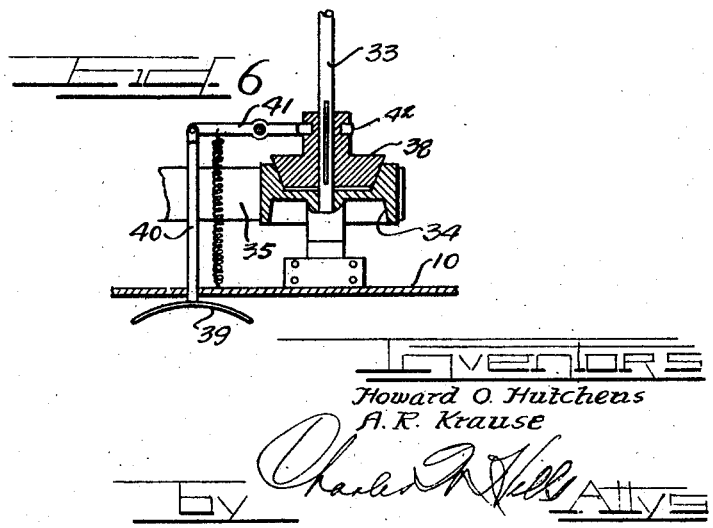
Inventors
Howard O. Hutchens
A. R. Krause Patented June 14, 1927.

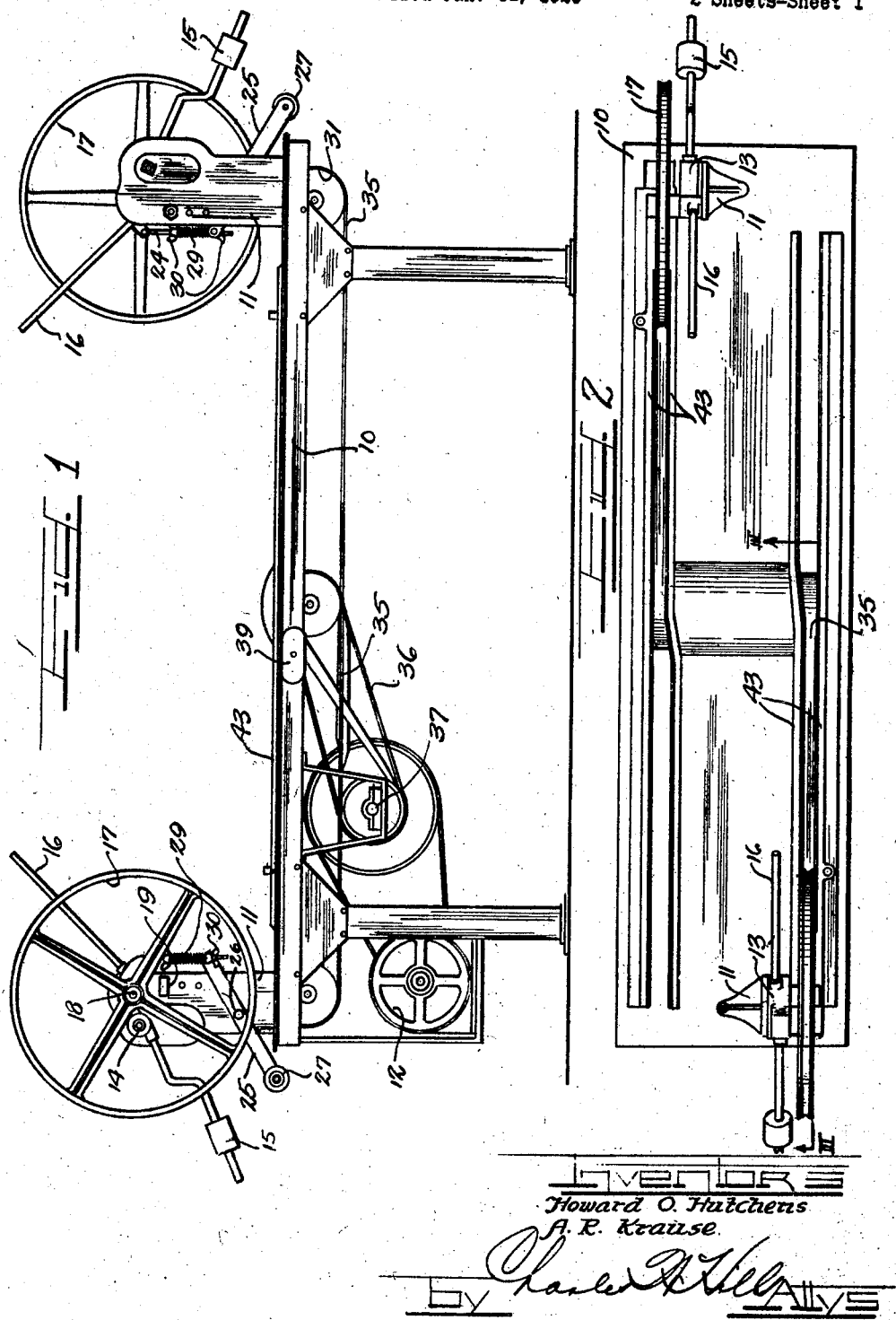

UNITED STATES PATENT OFFICE.

HOWARD O. HUTCHENS AND ARNOLD R. KRAUSE, OF EAU CLAIRE, WISCONSIN, ASSIGNORS TO GILLETTE RUBBER COMPANY, OF EAU CLAIRE, WISCONSIN, A CORPORATION OF WISCONSIN.

TIRE-TREAD-APPLYING MACHINE.

Application filed January 31, 1925. Serial No. 5,952.

This invention relates to a tread applying apparatus used in the building up of pneumatic tire carcasses prior to vulcanization thereof.

It is an object of this invention to provide an improved tread applying machine adapted to attain uniformity in tire construction and thereby reduce defects in the finished products due to insufficient rolling and inaccurate placing of the tread upon the tire body.

It is also an object of this invention to simplify the manufacturing process of applying a tire tread by reducing the time and skill required in applying the tread.

It is a further object of this invention to provide an improved tread applying machine wherein stretching of the tread stock is avoided by feeding the stock to the tire body on a belt, the tire body being free to rotate at the speed of advance of the tread stock.

Other and further important objects of this invention will be apparent from the disclosures in the specification and the accompanying drawings.

This invention as developed for applying treads to bicycle tires is shown on the drawings and hereinafter more fully described.

On the drawings:

Figure 1 is a side elevation of a duplex machine embodying the features of this invention.

Figure 2 is a top plan view thereof.

Figure 3 is a section on the line III—III of Fig. 2, with parts in elevation.

Figure 4 is an enlarged section on the line IV—IV of Figure 3.

Figure 5 is an enlarged section on the line V—V of Figure 3.

Figure 6 is an enlarged section on the line VI—VI of Figure 3.

As shown on the drawings:

A flat topped table 10 carries a pair of upright stands 11 on diagonal corners. These stands support duplicate mechanisms separately controlled by individual operators; although the apparatus on each end of the table has a common source of power in the motor 12. The stands 11 carry an arm 13 pivoted at 14 and provided with an adjustable counterweight 15. The arms are also provided with a hand lever 16. Mounted on the arm and balanced by the counterweight is a wheel or tire rim 17 journalled at 18 to turn freely. The arm pivot 14 is vertically adjustable to take wheels of varying diameters. By pulling down on the hand lever the rim of the wheel is brought into close relationship with the table 10, a limiting stop 19 being adjustably positioned on the stands to provide the desired space between the wheel rim and table, depending on the diameter of the tire body. The wheel rim 17 is grooved to receive the tire body 21 and apertured to receive the tire valve stem 22.

An extension 23 of the arm 13 has a rod 24 connected thereto leading to a lever 25 pivoted at 26 and carrying a grooved roller 27 adapted to be brought up against the tire body and tread 32 when the lever is pulled down to bring the wheel and tire into contact with the tread strip 28 on the table. The rod has a spring 29 and wingnut 30 adjustment to give the desired degree of resilient pressure of the roller against the tread when the arm 13 is moved to its limiting stop 19.

Directly below the grooved wheel is located an idler pulley 31 the top of which is tangent to the table surface. Centrally located crosswise of the table is a jack shaft 33 having a clutch pulley 34 on either end thereof, belts 35 being trained over the pairs of pulleys, the inner side of the belt sliding over the top of the table surface. The jack shaft may be driven by a belt 36 from a countershaft 37 which in turn is driven by the motor 12. A cone clutch 38 is slidable on the jackshaft and is actuated by a push plate 39 positioned on the side of the table and connected by the rod 40 and pivoted lever 41 to the thrust collar 42 of the clutch.

Resting on the table on either side of and extending partly over the belt are two flanged plates 43 which act to form a guiding groove for the tread strip and are adjustable sidewise to care for varying widths of tread strips.

In use each unit is under entirely separate control, a previously constructed bicycle tire body of the type known as a single tube being placed in the wheel grooves, when the wheel is in its suspended position, with the valve stem projecting through the rim. A valve is inserted in the stem and the tire body inflated to make it firm. A tread strip is then laid between the plates 43 directly on the surface of the belt 35. The operator then pulls down on the hand lever to bring the tire body into contact with the tread strip, which operation also brings the roller 27 into contact with the tire body. Then by leaning against the clutch push plate the belt is advanced carrying the tread strip under the tire body. The tread strip adheres to the body and is carried up to the roller as the wheel revolves due to rolling on the advancing tread strip. The roller has a smoothing and stitching action insuring complete contact between the tread and tire body. After the entire strip has passed onto the tire the wheel may be returned to its suspended position or may be given several more passes through the roller if necessary to improve the bond between the tread and body. By removing the valve the tire is deflated and may then be removed from the grooved wheel.

We are aware that many changes may be made and numerous details of construction may be varied through a wide range without departing from the principles of this invention, and we therefore do not purpose limiting the patent granted hereon, otherwise than necessitated by the prior art.

We claim as our invention:

1. An apparatus of the character described comprising a table, a power driven belt running over the surface of the table and adapted to advance a tread strip, tread strip guides positioned over the belt, a stand on said table, an arm pivoted to said stand, and a wheel mounted on said arm adapted to carry a tire body, the tire body on said wheel being brought into contact with the tread strip by a movement of said arm.

2. An apparatus of the character described comprising a table, means for feeding a tread strip over the table, a stand on said table, an arm pivoted to said stand, and a wheel mounted on said arm adapted to carry a tire body, the tire body on said wheel being brought into contact with the tread strip by a movement of said arm.

3. A device of the class described comprising a tread feeding belt, means for controlling the belt at the will of the operator, a wheel adapted to carry a tire body, means for bringing the wheel and tire body into contact with the tread on said belt, and a roller resiliently linked to said wheel shifting means adapted to roll the tread into position on the tire body.

4. A bicycle tire tread applying machine comprising means adapted to advance a strip of tread stock, a grooved wheel adapted to have a tire body mounted thereon and inflated, means adapted to shift said tire carrying wheel into contact with said tread strip, a roller, and means linked to said wheel shifting means adapted to simultaneously advance said roller into contact with the tire mounted on said wheel.

In witness whereof, we have hereunto subscribed our names.

HOWARD O. HUTCHENS.
ARNOLD R. KRAUSE.